US005501260A

United States Patent [19]

Young

[11] Patent Number: 5,501,260

[45] Date of Patent: Mar. 26, 1996

[54] METHOD USING A JIG FOR AFFIXING AN ADAPTOR TO THE BOTTOM OF A BUSINESS CARD

[76] Inventor: Edward R. Young, 3030 Oak Ridge Pl., Grand Prairie, Tex. 75051

[21] Appl. No.: 128,378

[22] Filed: Sep. 28, 1993

[51] Int. Cl.$^{6}$ .......... B32B 31/14

[52] U.S. Cl. .......... 156/247; 156/60; 156/289; 156/DIG. 23

[58] Field of Search .......... 156/60, 391, DIG. 23, 156/247, 289; 40/360; 402/79, 500; 269/303, 319, 329, 909; 281/2, 51; 283/62, 81, 117

[56] References Cited

U.S. PATENT DOCUMENTS

| | | | |
|---|---|---|---|
| 2,969,106 | 1/1961 | Reibel et al. | 156/60 |
| 3,679,198 | 7/1972 | Weggeland | 269/319 |
| 4,643,452 | 2/1987 | Chang | 283/62 |
| 4,710,084 | 12/1987 | Ludvigsen | 412/9 |
| 4,949,484 | 8/1990 | Finger | 40/359 |
| 5,018,897 | 5/1991 | Horgan | 402/79 |

FOREIGN PATENT DOCUMENTS 0052018 5/1982 European Pat. Off..

*Primary Examiner*—Michael W. Ball

*Assistant Examiner*—Richard Crispino

*Attorney, Agent, or Firm*—Charles W. McHugh

[57] ABSTRACT

A jig that may be used to temporarily position a thin adaptor so that it can be attached near the bottom edge of a small, generally planar member such as a card (e.g., a conventional business card or photo, etc.). The jig controls the placement of adaptors and cards with respect to one another, so that each card/adaptor combination will be neatly aligned and spatially balanced. On one of the adaptor's faces there is provided a strip of adhesive that is adequate to permanently attach the adaptor to the bottom portion of a card. The adaptor's lower portion has a set of spaced notches that are designed to mate with (and be held by) a set of rails on a conventional holder, such as a desk-top holder manufactured by the Rolodex Corporation. A generally planar member that makes up the body of the jig, and a set of spatial locating elements is permanently affixed thereto. The generally planar member may be integrally molded into the top of a plastic box that serves as a storage container for a plurality of adaptors. By combining a storage container for adaptors with an alignment jig for connecting those adaptors to business cards or the like, there will be less risk of a secretary having adaptors on hand but not being able to find the alignment jig to efficiently use them. The storage container also provides an effective way of merchandising both the adaptors and the alignment jig.

5 Claims, 2 Drawing Sheets

FIG. 1
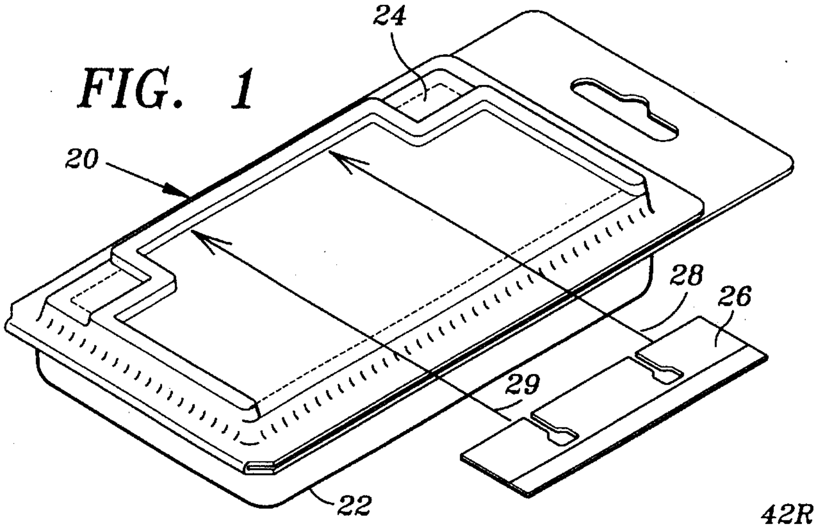
FIG. 2
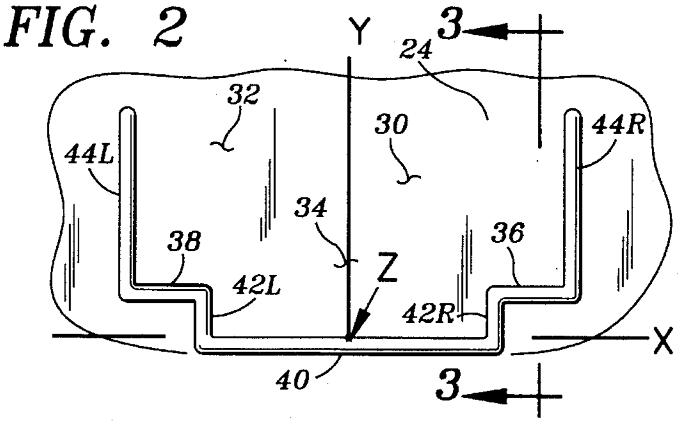
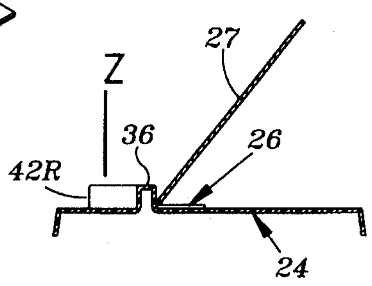
FIG. 3
FIG. 4
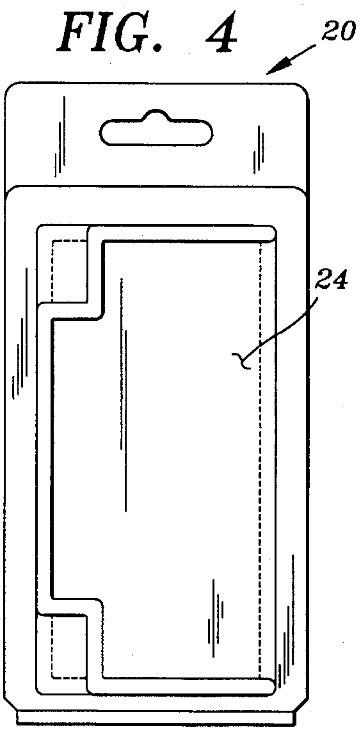
FIG. 5
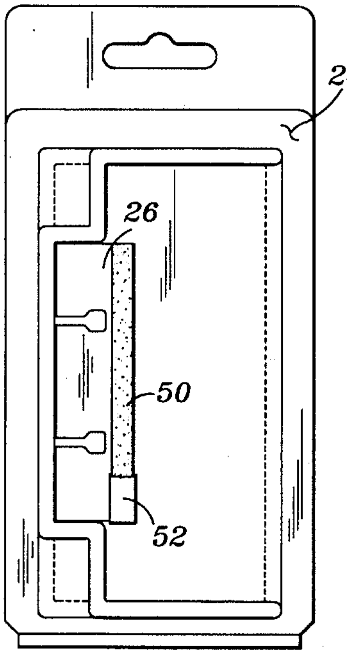
FIG. 6
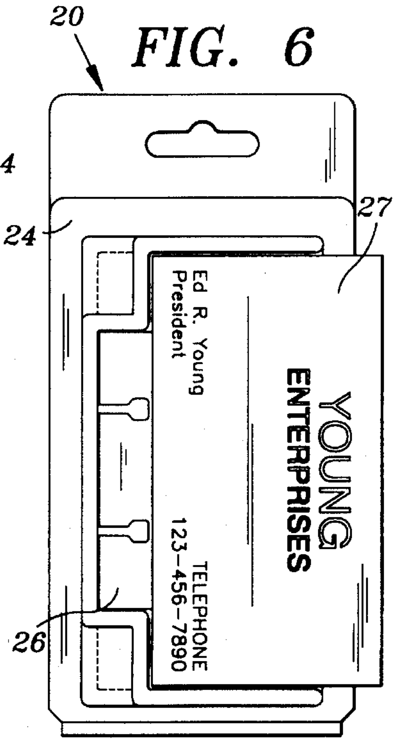

FIG. 7
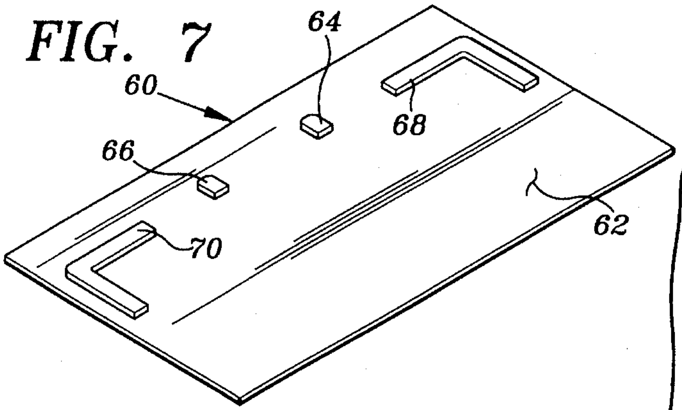
FIG. 8
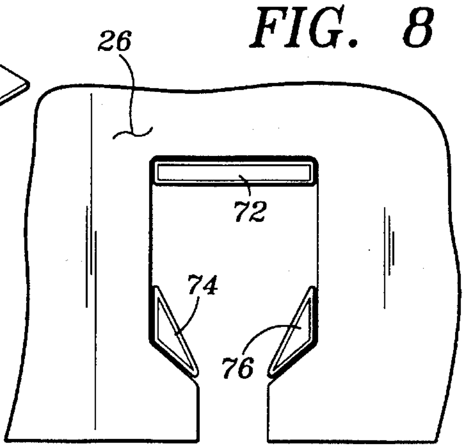
FIG. 9
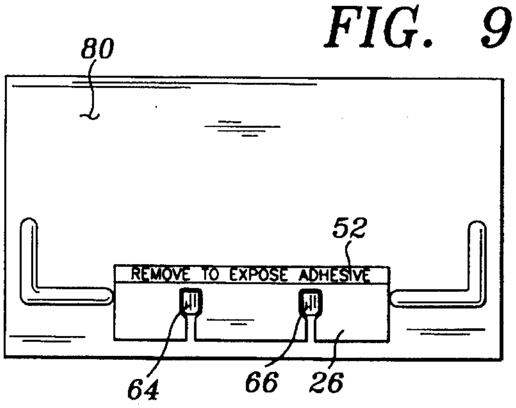
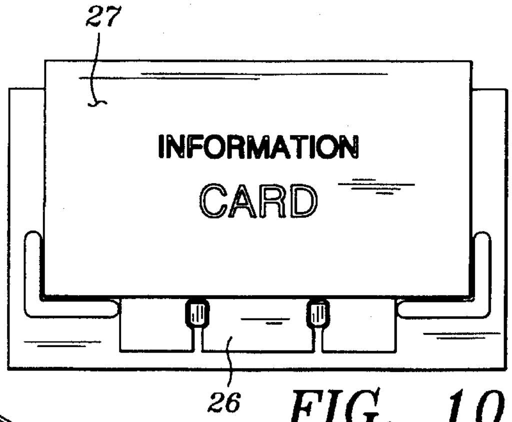
FIG. 10
FIG. 11
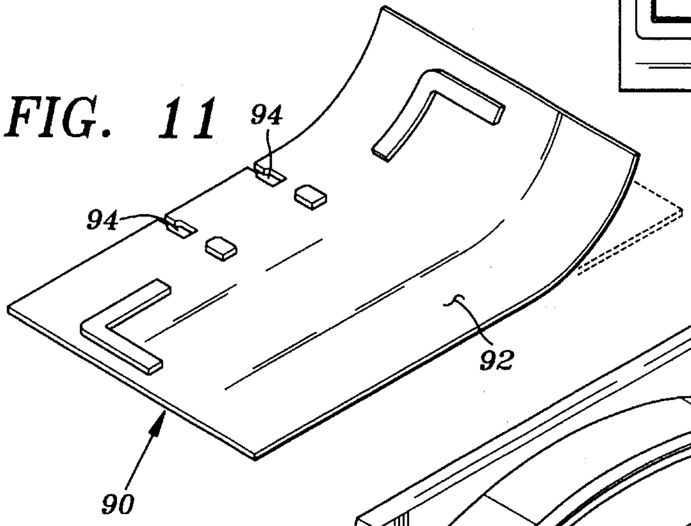
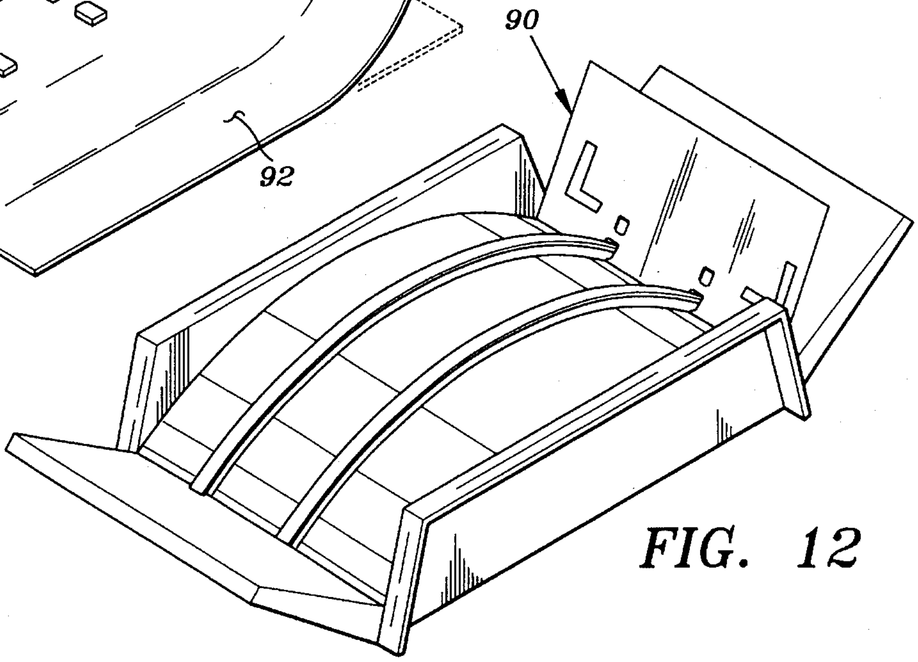
FIG. 12

METHOD USING A JIG FOR AFFIXING AN ADAPTOR TO THE BOTTOM OF A BUSINESS CARD

FIELD OF THE INVENTION

This invention relates generally to a method and an apparatus for facilitating the organization and storage of small and generally planar goods—and especially cards (including business cards, recipe cards and the like) in a desk-top holder that was designed to hold specially shaped cards with notches along their bottom edges; more specifically, the invention relates to the installation of an appendage that is adapted to be affixed to a card adjacent its bottom edge—in order to render the card compatible with a desk-top holder having two parallel rails.

BACKGROUND OF THE INVENTION

During the so-called Victorian period in England, the practice of furnishing "calling" cards flourished—when guests visited the homes of persons who were socially proper and were sufficiently educated as to be able to read. The cards were normally discreetly deposited by guests in a tray that was placed on a stand near the entrance hall of the house, and they served to provide a host with the names of guests who had visited or made a social "call." While the social practice of leaving cards near a host's front door may have waned over the past two hundred years or so, the derivative use of such cards—for business purposes—has greatly increased. In the U.S., business cards have become more or less standardized at about 2 inches by 3.5 inches, and they serve a valuable purpose that is similar to that of the original calling card, namely, to provide printed information about the person who carries the card, or the company that he or she represents. Such cards are now routinely carried for distribution to others, as a professional courtesy, etc., at the time of an initial encounter.

Another custom that is pertinent as background information for this invention is the practice of accumulating information of the type that normally appears on business cards onto index cards—and filing those index cards in a holder that can be placed at a convenient spot on a desk. Such index cards are widely sold by the Rolodex Corporation of Secaucus, N.J., and they have a pair of spaced notches along a bottom edge that permit the cards to be held in a compact holder having a pair of parallel rails. However, the transfer of information from a business card to an index card is not without some risks and problems. For one thing, it is time-consuming for a typist to take information from one piece of paper (the business card) and type the information onto another piece of paper (an index card). Too, there is always the risk of human error creeping into the transfer process, such as transposing the numerals in a telephone number or an address, or misspelling a name. And if a name is not spelled accurately when it is transferred to an index card, there is the risk of possible embarrassment to the writer if correspondence is addressed in accordance with erroneous information on an index card.

It is only natural, therefore, that persons have tried to avoid the hazards that are associated with the manual transfer of information from a business card to an index card. One way has been to simply affix a business card directly to an index card—or at least a card that has the appropriate notches along a bottom edge, so that it can be used like a conventional index card. A variety of such cards are shown in U.S. Pat. No. 4,930,928 to Ristuccia entitled "Index Card For Index Card File." Another approach might be to provide a transparent, plastic sleeve into which a business card could be slipped, and provide the requisite pair of notches on the bottom edge of the sleeve. In fact, there are transparent sleeves that are sold by the Rolodex Corporation and identified as "transparent card protectors." However, the sizing of these commercially available sleeves makes it apparent that they are designed to be slipped over ROLODEX index cards rather than business cards. That is, the "card protectors" are about 2.25 inches high and 4 inches long, which is the same size as the conventional small ROLODEX index card. And when a business card is slipped into such a sleeve, there is not enough clearance for a holder's two rails at the bottom of the business card; therefore, scissors or a hole punch would be needed to cut away part of a business card so that it could be used inside such a sleeve.

Another product offered by the Rolodex Corporation is specifically intended to be used with business cards. This product is identified by the code BC-40 and is described in packaging that was copyrighted in 1992 as a "business card adhesive tab." The text that accompanies the product states "clear plastic notched tabs convert any business card into a Rolodex® style card." The ROLODEX tab looks quite similar to the "business card attaching strip" shown in U.S. Pat. No. 4,643,452 to Chang, and it is 3.5 inches long by 1 inch high. That is, the ROLODEX adhesive tab is the same length as a conventional business card but not as high.

It is also known to modify a conventional business card in such a way that it can be secured directly in a conventional holder for index cards. This may be done by using a punch of the kind shown in U.S. Pat. No. 4,869,143 to Merrick et al. entitled "Card File Punch." Regrettably, conventional business cards have become more or less standardized in size, but they are not at all consistent in the way that information is printed on a front surface. Business cards are printed by literally thousands of printers, most of whom have their own ideas of how certain information should be placed on a card for maximum impact, etc. Some cards are printed with wide margins all around the centrally printed information, while others have a lot of important information crowding the bottom edge of the cards. It can easily happen, therefore, that a Merrick-type punch could cut away some digits of a telephone number or numerals of an address during the creation of the required notches.

Another US patent discloses the step of affixing an adaptor to the bottom of a business card with an adhesive or the like; the adaptor already has the requisite notches to permit controlled holding (i.e., filing) in a desk-top holder, and there is never a risk of mutilating the business card. The patent is U.S. Pat. No. 4,917,523 to Merrick et al. entitled "Card File Mounting System," and it is similar to the aforementioned Chang '452 patent, except that the mounting members are not as long as the typical business card. Adaptors (also described as self-adhesive tabs) currently being marketed by Newell Office Products Group under the trademark "VALUABLE CONTACTS" are said to have been manufactured under this patent; but they are being sold in a so-called "automatic" dispenser box having a roll of 100 adaptors, so their relationship to the Merrick '523 patent is not understood.

Another card-holding system is shown in U.S. Pat. No. 4,963,049 to Pearson entitled "Business Card Filing Attachment," in which two stiff juxtaposed strips are expected to provide enough frictional engagement with the bottom of a business card to "grab" it and hold it securely. Still another adaptor is shown in U.S. Pat. No. 5,018,897 to Horgan entitled "Card File Adaptor." The Horgan construction is distinguishable from other adaptors in having what are called "leveling tabs" for aligning a business card with respect to an adaptor before the two are fixed together with an adhesive. While the Horgan construction definitely offers an advantage over all of the earlier adaptors—in that it at least provides a one-direction alignment feature, it does so by introducing non-planar tabs or "bumps" into the adaptors. This has the effect of essentially doubling the effective thickness of a business card (with an adaptor affixed thereto) for storage purposes, and consequently cutting the capacity of a holder in half. And while Horgan does state that his tabs and/or bumps might be bent back into the plane of an adaptor after a business card has been affixed to the adaptor, it is not clear how his relatively small tabs or bumps could be manipulated or how much extra secretarial time this might consume.

In all of the above patents, bottom-edge notches are provided or created that are designed to mate with, and be held by, two parallel rails on a desk-top holder. In cross-section, modern rails may be described as having the appearance of a "T"; or, they may simply have an elongated member that is structurally suspended at the same place where the top of a "T" would normally be located. It is also known that some rails may have a cross-section that is more nearly cylindrical, such that the rails appear like two cylindrical rods of a relatively small diameter. The notches on cards that mate with these rails typically have wide internal voids that are connected to a bottom edge with narrow throats; the notches are often described as being shaped like a "dumbbell," although they actually have some similarity in appearance to only one-half of a true dumbbell (as seen in elevation).

While the use of certain adaptors has no doubt been beneficial in helping a secretary save time and avoid mistakes in typing, there has still been room for improvement with the techniques referred to above. For one thing, an adaptor like that shown in the Pearson '049 patent will take up a significant amount of front-to-rear space, as shown in FIG. 2 of the '049 patent. This would mean that fewer cards could be filed in a given holder, or the cards that are filed would be more tightly packed into a limited space. In fact, the drawing would suggest that only one-half to one-third as many cards might be stored in a holder—if Pearson adaptors are used instead of conventional index cards. Too, there is the matter of the neatness with which a plurality of cards are filed. When an adhesive is expected to securely hold a business card to an adaptor, it must be a strong adhesive, and so-called contact or pressure-sensitive adhesives are normally used. With such adhesives, there is no opportunity to adjust, correct or straighten any initial misalignment between an adaptor and a business card; such adhesives are designed to grab and securely hold almost instantaneously. So if there is any initial misalignment between a card and an adaptor, it will become an immediate and permanent misalignment. It follows therefore that there has remained a need for some technique for connecting a business card to an adaptor in such a way that their spatial relationship will be predictable, neat and orderly—without unnecessarily increasing the thickness of the combination. It is an object of this invention to provide such a technique.

Another object is to provide a separate alignment jig that will remove all guess-work as far as the proper orientation of a business card and an adaptor—before they are permanently joined together.

A further object is to provide a technique for quickly modifying a business card by connecting it to an adaptor, so that the combination may be rapidly installed in a desktop holder for index cards.

One more object is to provide an alignment jig that can be formed as an integral part of a storage container for adaptors, so that a secretary will not likely be caught in the condition of having adaptors on hand but not being able to find the tool with which to optimally use those adaptors.

Still another object is to provide a way of organizing and storing any of a variety of card-like items, including business cards, recipe cards, photographs, 3×5-inch index cards, etc., in such a way that they are neat and orderly, even though they may have been manually handled on a one-by-one basis.

These and other objects will be apparent from a reading of the specification that follows, as well as the claims that are appended thereto and the several figures of the drawing that are provided herewith.

BRIEF DESCRIPTION OF THE FIGURES OF THE DRAWING

FIG. 1 is a perspective view of a preferred embodiment of the invention in which an alignment jig is molded into the top of a container for storing business card adaptors;

FIG. 2 is a top plan view of a generally planar member (which can constitute a part of the lid for a container as shown in FIG. 1), and also showing an X-Y-Z coordinate system superimposed on the lid to provide a means of defining certain spatial relationships;

FIG. 3 is a side elevation view of the generally planar member of FIG. 2, and partially broken away to reveal how a business card can be dependably located with respect to the planar member;

FIG. 4 is a top plan view of the container shown in FIG. 1, which is the way the container would appear when hanging on a card holder in a retail store;

FIG. 5 is a top plan view of the container shown in FIG. 1, and showing the first step of combining an adaptor and a business card, namely, correctly positioning an adaptor with respect to its spatial locator;

FIG. 6 is a top plan view of the container shown in FIG. 5 and illustrating a subsequent step in the process, namely, locating a business card with respect to an adaptor that has already been properly positioned on top of a generally planar member;

FIG. 7 is a perspective view of another embodiment of the invention in which a generally planar member does not constitute a part of a container for storing adaptors;

FIG. 8 is a top plan view, on a much larger scale, of a set of elements that can aid in securing an adaptor against unwanted movement—prior to the time that the adaptor is secured to a business card or the like;

FIG. 9 is a top plan view of the jig shown in FIG. 7, and showing an adaptor placed on top of the jig, with a typical release strip still in place over the adhesive;

FIG. 10 is a top plan view of the jig shown in FIG. 7, and showing the placement of a card over an adaptor—after the release strip has been pulled off to expose the adhesive;

FIG. 11 is a perspective view similar to that of FIG. 7, and showing an embodiment of a jig that is molded of a flexible material that can be bent for storage in a non-planar manner; and FIG. 12 is a perspective view of a holder of the type that is customarily used to hold business cards and the like, and showing it holding an exemplary jig that has been made in accordance with this invention.

BRIEF DESCRIPTION OF THE INVENTION

An article of manufacture is disclosed that has utility as a jig in temporarily positioning a thin adaptor so that it can be attached near the bottom edge of a small, generally planar member such as a card (e.g., a conventional business card). The object of the jig is to control the placement of adaptors and cards with respect to one another, so that each card/adaptor combination will be neatly aligned and spatially balanced. By use of the term "conventional business card," it is meant one that comprises a planar and generally rectangular piece of card stock having front and back surfaces and usually having printed matter on its front surface. The size of such a business card will usually be about 2 inches by 3.5 inches, but the principle of the invention could easily be adapted to accommodate cards of other types and sizes, as well as other small, planar items such as photographs, etc.

The article of manufacture includes means for temporarily supporting an adaptor in a prescribed position, and then making provision for controllably introducing a card, so that the adaptor and the card may be subsequently affixed to one another. This temporary support means will usually include a generally planar element that is adapted to rest horizontally on a desk top, table or the like. The contemplated adaptor may be described as having an upper portion and a lower portion, and a front face and a rear face. On one of the adaptor's faces there is provided a strip of adhesive that is adequate to permanently attach the adaptor to the bottom portion of a card. The adaptor's lower portion has a set of spaced notches that are designed to mate with (and be held by) a set of rails on a conventional holder. Most desk-top holders have two rails; accordingly, there will usually be two downwardly facing notches on each adaptor.

A set of at least two spatial locating elements is permanently affixed to the generally planar member in such a way that the step of placing an adaptor and a card in the same relative position can be repeated, time after time, for literally thousands of card/adaptor combinations. The preferred locating elements consist of right, left and central elements, all of which are used to achieve a desired spatial relationship in what may be referred to as a "Y" direction. The central element is used to position the adaptor where it will be relatively "low," and the right and left elements are used to position a card where it will be elevated with respect to the adaptor. Other locating elements may be provided to achieve a desired spatial relationship in an "X" direction.

One manner of affixing a card to an adaptor is to initially locate the adaptor on top of the generally planar element where it will butt against a central locating element. The adaptor is oriented so that the adhesive strip is facing upwardly. A protective strip that guards the adhesive against contamination is then peeled off—to expose the entire adhesive surface. A card that is to be eventually mounted in a holder is then tilted so that it forms a substantial angle (e.g., an angle of about 45 degrees) with respect to the adaptor. The lower edge of the card is gently placed against the right and left locating elements to correctly locate the card with respect to the adaptor. Depending on where a manufacturer has placed the adhesive on the adaptor, there may be some limited contact (and hence adhesion) between the adhesive and the bottom edge of the card by this initial orientation step. In any event, the card is subsequently rotated downward (about its lower edge) until the card and the adaptor essentially become co-planar. Pressing downward on the card with a modest force is then all that is necessary to ensure that the card and the adaptor will be adhesively bonded to one another. Because both an adaptor and a card are spatially oriented with respect to one another before they are juxtaposed in essentially the same plane, the process can be repeated with thousands of adaptors and cards—and every combination will be correctly aligned, centered and symmetrical.

In another embodiment, an alignment jig is designed with locating elements that mate with the notches at the bottom of an adaptor—rather than the bottom edge of the adaptor. It is expected that the adaptor will be the first of two elements that is positioned, followed by placement of a card with respect to a static adaptor. In fact, though, there is probably no major reason why someone might not reverse the order of handling a card and an adaptor.

In a preferred embodiment, the generally planar support member is integrally molded into the top of a plastic box that serves as a storage container for a plurality of adaptors (e.g., about 50 adaptors). By combining a storage container for adaptors with an alignment jig for connecting those adaptors to business cards or the like, there will less risk of a secretary having adaptors on hand but not being able to find the alignment jig to efficiently use them. And, the storage container also provides an effective way of merchandising both the adaptors and the alignment jig.

Detailed Description of a Preferred Embodiment of the Invention

Referring initially to FIG. 1, a storage container 20 is shown with a base 22 and a hinged lid 24 in its closed condition. The location of the hinge in this embodiment is along the bottom of the container (when the container is hanging vertically), but its location is not critical; it could just as well be located along a side. The container 20 has a relatively small depth, e.g., one-half inch or less, but it can still hold about 50 to 100 adaptors 26, one of which is shown adjacent the container. Two arrows 28,29 are provided in this drawing to illustrate eventual movement of the planar adaptor 26 to a position on the lid 24 where the adaptor will be ready to be affixed to a card.

The lid 24 will be recognized as a generally planar member, when molded from thermosetting plastic, it will usually have a thickness in the range of about 0.020 to 0.080 inch, which is stiff enough to provide quite adequate support for an adaptor 26—even if someone is pressing down on a card and adaptor to "set" the adhesive. Turning next to FIG. 2, an X-Y-Z coordinate system has been added to the showing of a portion of the generally planar lid 24; the lowermost segment of the lid has been arbitrarily assigned a Y-value of zero. The lid 24 also has a right region 30 and a left region 32, each of which can be described by X-values, with the midpoint of the lid having an X-value of zero. Between the right and left regions 30,32 is a central region 34. The Z-axis of the coordinate system is perpendicular to the plane of the paper; values along the Z-axis can be used to define the thickness of the lid, etc.

Distributed across the upper surface of the lid 24 are a plurality of spatial locating elements. A right element 36 is positioned in the right region 30 at a positive Y-value, and a left element 38 is positioned in the left region 32 at a height that is essentially identical to the right element. As illustrated, the right and left locators 36,38 are of generally equal size and shape, and they may also be described as being linearly aligned. Their function is to serve as bottom locators or "stops" for the bottom edge of a card that is to be modified in accordance with this invention by the attachment of an adaptor 26. Hence, the locators 36,38 need to have a height above the top of the lid 24 (as measured in the Z-axis) that is adequate to serve as a physical stop against which a card can be pushed. Because business cards and the like seldom have a thickness of more than 0.030 inch, it might be argued that the locators 36,38 need only have a height of about 0.030 inch. But experience has shown that a significantly larger height promotes quickness when someone is manually positioning a business card with respect to an adaptor, so a height of about 0.060 inch is preferred for the locators. Use of the locators 36,38 is shown in FIG. 3, in which the bottom edge of a business card 27 is shown butted against a transverse surface of the two spaced locators.

A central locating element 40 is also affixed to the top of the lid 24, and it extends linearly across the central region 34. The function of element 40 is to serve as a physical stop for an adaptor 26, so that an adaptor will always be located in a predictable spot when it is placed on top of the lid 24—at an early part of the attachment process. Although the contemplated adaptors 26 will usually be much thinner than a typical business card, aesthetics and manufacturing simplicity will usually dictate that all of the locating elements 36, 38, 40 have essentially the same height (as measured in a Z-direction) above the generally planar support surface. So even if the body of an adaptor 26 is made of MYLAR film and has a thickness of only a few thousandths of an inch, the central locating element will preferably have a height of about 0.060 inch. (MYLAR is DuPont's registered trademark for its polyester film.)

The relative placement of the right, left and central locating elements 36, 38, 40 (as measured in the Y-direction) is designed to foster the temporary placement of a business card at an elevated position with respect to an adaptor that has already been positioned at a known location. Assuming that the business card is to be eventually stored in a typical desk-top holder made by the Rolodex Corporation, the adaptor should probably extend below the bottom edge of a business card for a distance of between 5/16 and ½ inch. Hence, the height of the locating elements 36, 38 above the central locating element 40 should probably be between 5/16 and ½ inch. If the body of the adaptor 26 is made of relatively strong plastic (e.g., MYLAR film), there will likely be sufficient strength in the body around a given notch as to make 5/16 inch an adequate height. Because paper and/or card stock will usually be weaker than a plastic of equal thickness, more material may be justified around a given notch in a paper body, and a height of ½ inch may be justified.

In addition to the minimal quantity of "vertical" locating elements 36, 38, 40, it is also desirable to provide some "horizontal" locating elements, to help ensure that an adaptor and business card will always be centered with respect to one another when they are joined. This is accomplished by providing vertically oriented elements 42R and 44R on the right side of the alignment jig, and elements 42L and 44L on the left side of the jig. These vertically oriented elements (or mechanical stops) are located to the right and to the left from the Y-axis by identical distances; and—for both aesthetics and efficacy—they have a height (in the Z-direction) that is the same as the horizontal mechanical stops 36, 38. In fact, the vertical stops preferably constitute contiguous and generally planar extensions of the right and left stops 36, 38.

Because they extend in a Y-direction, the vertically oriented locators 44R, 44L extend approximately perpendicularly to the right and left elements 36, 38; as shown in the drawing, they are located at the remote ends of the right and left elements. The space between elements 42R and 42L is established to accommodate an adaptor 26; the preferred space between these two elements is about 2.5 inches, which leaves two shoulders 36, 38 that are about ½ inch long—against which a user can push a 3.5 inch business card during the mounting process. The space between elements 44R and 44L is established to accommodate whatever kind of card, photo, etc., is to held. To accommodate conventional business cards, the space between 44R and 44L should be just slightly more than 3.5 inches. An adaptor 26 that can be expected to slip easily between 42R and 42L will naturally be just slightly less than 2.5 inches long. FIGS. 4, 5 and 6 show the preferred sequence of: 1) laying a generally planar member on top of a horizontal table or the like, so that the member will have a suitable orientation to receive and hold the elements that are to be joined; 2) placing an adaptor on top of the planar member in such a way that the adaptor is correctly located and held, with the adhesive tape being exposed; and 3) subsequently placing a business card where its lower portion will rest in contact with the top of the adaptor, such that the adaptor and card may become bonded to one another.

Bonding of an adaptor and a card is advantageously achieved by providing an adhesive means on the adaptor, and allowing said adhesive means to passively stay with an adaptor until the adaptor is withdrawn from a storage container for attachment to a given one of a plurality of business cards. After the adaptor and a card have been placed in a proper orientation by use of what may be aptly called a jig, the upper portion of the adaptor is affixed to the lower portion of the card. When the adhesive means includes a pressure-sensitive medium, affixation is achieved by simply pressing on the card, etc. Such an adhesive means is preferably in the form of a long narrow strip (or tape) of pressure-sensitive adhesive that is permanently affixed to the adaptor at or near its top. An adhesive strip is represented in the drawing by the stippled area 50, but it is routinely covered by a selectively removable protective strip or liner 52. As is common practice with such a protective liner 52, it is manually pulled away from the adhesive 50 just prior to the time that a card and an adaptor are to be bonded together. A preferred adhesive is a medium-firm, pressure-sensitive acrylic adhesive sold by 3M's Industrial Specialties Division and identified as 920XL tape, which is in what 3M calls its "family" of A-50 acrylic adhesives. Newer adhesives are also available, and they are disclosed in U.S. Pat. No. 5,202,361 to Zimmerman et al., and U.S. Pat. No. 5,229,206 to Groves, both of which are assigned to Minnesota Mining and Manufacturing Company (also known as 3M). Examples of other types of adhesives that would be functional with this invention include contact adhesives and rubber-based adhesives; so it should be understood that any material or device that will effectively and permanently bond together the adaptor and a card should be adequate. Hence, it is not intended that the practice of this invention should be limited to an embodiment in which the preferred 3M adhesive is used.

In a second embodiment of the invention (shown in FIG. 7), an alignment jig 60 has been designed to provide locating elements 64, 66 that mate with the notches that are built into the bottom of an adaptor. (Of course, this differs from the first embodiment in which a linear locating element was provided, and it was expected that the bottom edge of an adaptor would simply butt against the linear element.) Referring to FIG. 7, a generally planar member 62 is shown, said member having a size that is larger than what is really needed to correctly orient a couple of pieces of paper stock. The relatively large size of the jig 60 is convenient to hold, and it provides ample space on which to print an advertising message or the like. Hence, the alignment jig 60 shown in this figure would serve nicely as a specialty advertising item for distribution to customers and potential customers to generate goodwill, etc. Because the shape and location of the locating elements 64, 66 are probably more important in this embodiment, a designer may choose to use injection molding processes to manufacture it, while vacuum forming processes may be advantageously used to produce alignment jigs that rely on locating against the bottom edge of an adaptor.

Referring still to FIG. 7, it should be noted that each of the shaped locating elements 64, 66 is shown as being large enough to essentially fill the space that is created when a notch is cut into the bottom portion of an adaptor; and this is the preferred manner of constructing this particular embodiment of the invention. But it would also be possible to provide either one or two mechanical stops whose shapes do not completely fill the space defined by a notch. This would be possible because the gap between edges 68, 70 can be established to be just very slightly wider than the width of an adaptor; so this gap can be used, along with one or more small peripheral segments, to accomplish the goal of dependably locating an adaptor. Such a construction is shown in FIG. 8, wherein segments 72, 74 and 76 are used to locate a notch (which is at the bottom edge of an adaptor 26) and hence locate the adaptor. A distinct advantage of a mechanical stop defined by segments 72, 74 and 76 is that an adaptor 26, when positioned on the jig, is held against movement upward, downward and sideward (as viewed in a plane that passes through the body of the jig). And, of course, gravity is always working on an adaptor 26 to keep it from blowing away. So the combination of gravity and one or more mechanical stops on a jig help ensure the stability that will foster repeated and accurate connections between adaptors and cards.

Perhaps it would be meaningful to point out here that the construction that has just been described is a marked improvement over devices of the prior art, in that a jig in accordance with this disclosure can hold a properly positioned adaptor against movement in five directions—while those of the prior art can only secure an adaptor against movement in two directions. This holding capability of a jig is shown in FIG. 9, where an adaptor 26 is shown resting on top of the generally planar surface 80, with the adhesive tape facing upwardly. By virtue of the locating elements 64, 66, the adaptor cannot slide to the right or the left, nor can it move up or down in a plane that is parallel to surface 80. And when the jig is oriented upright and held horizontally, the surface 80 prevents the adaptor from falling to the ground; so the adaptor is held, gently but securely, against unwanted movement in five directions.

Those skilled in the art will no doubt recognize that the jig shown in FIGS. 7, 9 and 10 could also be used in a manner that is procedurally opposite to the mounting sequence that has thus far been described. That is, a business card could be initially supported on a horizontally oriented jig; then the release strip could be peeled off an adaptor, and the adaptor placed at the appropriate place on the jig so that a downwardly facing adhesive tape can be pushed downwardly against the static business card. Those persons having good manual dexterity may find this procedure to be easy to accomplish; but it is believed that more people will prefer to safely position an adaptor on the jig before the release strip is ever removed.

The jig 60 in FIG. 7 has been illustrated as planar, and indeed it should be planar—in use. But that does not mean that it must be planar in what may be described as a storage mode. So a jig shaped like the one in FIG. 7 but molded from a flexible, rubbery material can be curled into a cylindrical shape and stored in something equivalent to a plastic pill container. By use of the term "rubbery material" it is meant a material having the characteristics of a tough but bendable rubber that is formed into the shape of a disk and used as a manual aid for removing the top of a fruit jar or the like. Inside such a plastic container and resting inside the curled jig, a large quantity of adaptors can be stored until they are needed Also, a jig that is molded of a resilient rubber can be provided with two notches along one edge, so that the jig can be readily stored in the front or the rear of a holder for index cards or the like. This is illustrated in FIG. 11, wherein jig 90 has a flexible base 92 with two identical notches 94 along its bottom edge, said notches being shaped, sized and located so that the base can be stored in the same manner that cards are stored in a conventional desk-top holder. One end of the base 92 has been shown bent upwardly to illustrate its flexibility, while the broken lines indicate its operational condition.

The size of the throat that leads to each notch 94 will influence the holding power of the rails on a holder. A narrow throat will have to deformed by a greater amount in order to pass over the rail of a holder; and a narrow throat will have to be deformed by the same amount when the base 92 is to be removed. Thus, a narrow throat will cause a base 92 to be more tightly retained, while a wide throat will contribute to a reduced holding power. But even a throat that is so large as to be essentially indistinguishable from the bulbous part of its notch will still contribute to holding a jig 90 in place. This is because notches 94 and their associated throats will at least preclude a base 92 from being slid either to the right or the left with respect to a holder; so even relatively large notches are useful in storing the jig 90 in an orderly manner. Together with the notches 94, gravity will help hold the jig 90 in position as long as the holder is not accidentally inverted. A jig 90 resting in a storage mode on an exemplary holder is shown in FIG. 12.

While only a few embodiments of the invention have been disclosed herein in great detail, those skilled in the art will no doubt recognize that variations in the invention could be introduced without departing from the general concept that has been disclosed. For example, a satisfactory jig in accordance with this invention can be made of a thermoplastic material (such as clear PVC), rubber, cardboard, aluminum, or even recycled scrap paper that has been molded to shape, etc. So the material from which a jig is made is not critical; instead, what is important is the ability to dependably position an adaptor with respect to a small planar body (such as a business card) to which the adaptor is to be affixed. Accordingly it should be understood that the invention should not be limited to the few examples that have been described; rather, the invention should be deemed to be limited only by the scope of the appended claims.

What is claimed is:

1. The method of combining a business card with an adaptor in such a way that the adaptor can be used to subsequently hold the business card in a holder having two parallel rails, said adaptor already having been provided with two side-by-side notches that are sized, shaped and located to mate with the two parallel rails of a holder, comprising the steps of:

a) placing an adaptor on top of a generally planar member where the adaptor will be supported with a controlled orientation at a first location, and the generally planar member having a pair of outwardly extending protuberances that are sized, shaped and located to mate with the pair of notches in the adaptor, and the adaptor being thin and generally planar and having upper and lower regions, and the adaptor having right and left sides and a central axis that lies in the plane of the adaptor and extends vertically between the two side-by-side notches, and the adaptor having a horizontal axis that lies in the plane of the adaptor and extends from one side of the adaptor to the other side, and said first location of the adaptor on the generally planar member being established by engagement of the adaptor's notches with the outwardly extending protuberances, and said first location also being controlled vertically in both up and down directions as well as horizontally to the right and to the left;

b) placing a business card on top of the generally planar member where the business card will be supported at a second location whose position with respect to the adaptor is controlled by a pair of spaced-apart elements that are permanently fixed with respect to the generally planar member, and the placement of the business card being such as to cause it to partially overlap and contact an upper region of the adaptor, and the business card's controlled position being one in which the card is centered with respect to the adaptor as well as being held at a finite distance above the adaptor's notches; and c) using an adhesive to secure the adaptor to the business card while the two are still in contact and being supported in a controlled position by the generally planar member, said adhesive having been provided in a region where the business card partially overlaps an upper region of the adaptor.

2. The method of combining a business card with an adaptor in such a way that the adaptor can be used to hold the business card in a holder having two parallel rails, said adaptor already having been provided with two side-by-side notches that are sized, shaped and located to mate with the two parallel rails of a holder, comprising the steps of;

a) placing an adaptor on top of a generally planar member where the adaptor will be supported with a controlled orientation at a first location, and the generally planar member having a lower edge and two notches in said edge that are similar to the notches in the adaptor, and the adaptor having right and left sides and a central axis that extends vertically between the two notches, and the adaptor having a horizontal axis that extends from one side of the adaptor to the other side, and the adaptor being thin and generally planar and having upper and lower regions, and said first location on the generally planar member being a function of the location of the notches in the adaptor, and said first location also being controlled in both vertical and horizontal directions;

b) placing a business card on top of the generally planar member where the business card will be supported at a second location whose position with respect to the adaptor is controlled, and the placement of the business card being such as to cause it to partially overlap and contact an upper region of the adaptor, and the business card's controlled position being one in which the card is centered with respect to the adaptor as well as being held at a finite distance above the adaptor's notches; and c) using an adhesive to secure the adaptor to the business card while the two are still in contact an being supported in a controlled position by the generally planar member, said adhesive having been provided in a region where the business card partially overlaps an upper region of the adaptor; and d. using the notches in an edge of the generally planar member to store the generally planar member in the holder until such time as the generally planar member is needed to secure an adaptor to a business card, and wherein the business card is secured to the adaptor while the generally planar member remains in the holder.

3. The method of attaching an adaptor to the bottom portion of a business card in such a way that the business card may be subsequently held in a controlled relationship with respect to a holder having two parallel rails, said adaptor having upper and lower portions and the lower portion having a pair of notches that are configured to mate with and be held by the rails of the holder, and the business card having top and bottom portions and a lower edge and a width, comprising the steps of:

a. placing the adaptor in a managed position on a holding jig, said holding jig having parts whose locations are measurable by an X-Y-Z coordinate system, and the adaptor lying in a plane that is defined by the X- and Y-axes of said X-Y-Z coordinate system, and the holding jig being designed to place the upper portion of the adaptor at a controlled position above (as measured in a Y-direction) a pair of separated but co-linear locating elements, and the lower portion of the adaptor being positioned below (as measured in a Y-direction) said pair of locating elements, and the holding jig also being designed to place the adaptor at a controlled position as measured in an X-direction, and said locating elements forming rigidly fixed and permanent parts of the holding jig;

b. providing a quantity of pressure-sensitive adhesive along the upper portion of the adaptor, in order that the upper portion of the adaptor may be adhesively bonded to the lower portion of the business card by manually pressing on the lower portion of the business card after it has been juxtaposed with the upper portion of the adaptor, and the pressure-sensitive adhesive being provided on the adaptor in the shape of an elongated strip that is temporarily protected by a selectively removable protective cover, such that an adaptor may be attached to a business card only after the adhesive is exposed by removing the protective cover, and the holding jig being integrally formed with a planar part of a storage container, whereby a plurality of such adaptors and their protective covers may be kept in the storage container and in close proximity to the holding jig until the adaptors are needed for attachment to respective business cards;

c. providing on the holding jig a second pair of locating elements that are integrally formed with the holding jig so as to serve as permanently fixed locators, and said second pair of locating elements being spaced apart along an X-axis by an amount that is just slightly greater than the width of the business card, and said second pair of locating elements being equally spaced in an X-direction from a central Y-axis;

d. inclining the business card so that it is tilted in a Z-direction away from the plane defined by the X- and Y-axes, and placing the lower edge of the business card in contact with the first pair of locating elements, and centering the business card between the second pair of locating elements;

e. subsequently rotating the business card about its lower edge in a downward direction until the lower portion of the business card comes into contact with the adhesive on the upper portion of the adaptor, such that a lower portion of the business card will be juxtaposed with an upper portion of the adaptor; and f. adhesively bonding the upper portion of the adaptor to the lower portion of the business card while they are being supported by the holding jig, whereby the business card may later be secured in a holder by virtue of connecting the lower portion of the adaptor to the rails of the holder.

4. The method as claimed in claim 3 wherein the business card is centered with respect to an adaptor by initially placing the adaptor on the holding jig in a centered location that is established using the same notches that will subsequently be used to secure a business card in a holder, and then positioning the business card on the holding jig between two locating elements that are equally spaced in an X-direction from a central Y-axis.

5. The method as claimed in claim 3 wherein the holding jig is initially oriented so that it is approximately horizontal before an adaptor is placed on it, and the holding jig is maintained approximately horizontally until the combination of an adaptor and an adhesively bonded business card can be removed from the holding jig, and wherein the adaptor is maintained in a desired position on the holding jig, at least in part, by cooperation of the pair of notches in the adaptor and the first pair of locating elements on the holding jig, whereby the combination of the first pair of locating elements and gravity may be relied upon to hold the adaptor in place and there is no need to physically restrain the adaptor from falling off the jig.

* * * * *